United States Patent
Su et al.

(10) Patent No.: US 10,797,777 B2
(45) Date of Patent: Oct. 6, 2020

(54) METHOD FOR COMMUNICATION BETWEEN TERMINALS, NETWORK-SIDE DEVICE, AND TERMINAL

(71) Applicant: HUAWEI TECHNOLOGIES CO., LTD., Shenzhen, Guangdong (CN)

(72) Inventors: Hongjia Su, Shanghai (CN); Yingpei Lin, Shanghai (CN); Jiyong Pang, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/535,932

(22) Filed: Aug. 8, 2019

(65) Prior Publication Data
US 2019/0372647 A1    Dec. 5, 2019

Related U.S. Application Data

(63) Continuation of application No. PCT/CN2018/073446, filed on Jan. 19, 2018.

(30) Foreign Application Priority Data

Feb. 10, 2017    (CN) .......................... 2017 1 0073998

(51) Int. Cl.
*H04B 7/06* (2006.01)
*H04W 76/14* (2018.01)
*H04L 5/00* (2006.01)

(52) U.S. Cl.
CPC ......... *H04B 7/0695* (2013.01); *H04B 7/0639* (2013.01); *H04L 5/0023* (2013.01); *H04W 76/14* (2018.02)

(58) Field of Classification Search
CPC ... H04B 7/0695; H04B 7/0639; H04W 76/14; H04W 72/0446; H04W 16/28;
(Continued)

(56) References Cited

U.S. PATENT DOCUMENTS 10,536,949 B2 *    1/2020  Sheng ................... H04W 48/12
2012/0099540 A1 *  4/2012  Doppler et al.
(Continued)

FOREIGN PATENT DOCUMENTS

CN    105340132 A    2/2016
CN    106341170 A    1/2017
(Continued)

OTHER PUBLICATIONS

Ericsson: "On spatial QCL definition", 3GPP Draft; R1-1700771, 3rd Generation Partnership Project (3GPP), vol. RAN WG1, Spokane, WA, USA; Jan. 16, 2017. XP051208292. total 5 pages.

(Continued)

*Primary Examiner* — Hirdepal Singh
(74) *Attorney, Agent, or Firm* — Womble Bond Dickinson (US) LLP

(57) ABSTRACT

This application relates to the field of wireless communications technologies, and provides a method for communication between terminals, a network-side device, and a terminal. The method discloses that the network-side device allocates, to the terminal, time-frequency resources for transmitting uplink information and sidelink information. On the time-frequency resources and at a same moment in a range of time domain-frequency resources, the terminal transmits the uplink information used for performing uplink beamform training to the network-side device, and transmits the sidelink information used for performing sidelink beamform training to another terminal. According to solutions provided in this application, based on conventional uplink and downlink beamform training procedures, the terminal performs the sidelink beamform training without additionally using a new time-frequency resource.

15 Claims, 9 Drawing Sheets

(58) Field of Classification Search
CPC .......... H04W 72/0493; H04W 72/0453; H04L 5/0023; H04L 5/00
USPC ........................................................ 375/262
See application file for complete search history.

(56) References Cited

U.S. PATENT DOCUMENTS

| | | |
|---|---|---|
| 2012/0322484 A1* | 12/2012 | Yu et al. |
| 2015/0333811 A1* | 11/2015 | Yu .......................... H04B 7/0617 370/329 |
| 2015/0382268 A1 | 12/2015 | Hampel et al. |
| 2016/0157258 A1* | 6/2016 | Saiwai et al. |
| 2018/0083719 A1* | 3/2018 | Kim ........................ H04L 25/02 |
| 2019/0090218 A1* | 3/2019 | Noh .................... H04L 27/0006 |
| 2019/0166620 A1* | 5/2019 | Yasukawa ............. H04W 24/08 |
| 2019/0174530 A1* | 6/2019 | Kim ...................... H04L 1/0003 |
| 2019/0297635 A1* | 9/2019 | Wu et al. |

FOREIGN PATENT DOCUMENTS

| | | |
|---|---|---|
| WO | 2016/003624 A1 | 1/2016 |
| WO | 2016153265 A1 | 9/2016 |
| WO | 2016/180207 A1 | 11/2016 |

OTHER PUBLICATIONS

Intel Corporation: "Considerations on eV2X NR design", 3GPP Draft; R1-1612007, 3rd Generation Partnership Project (3GPP), Mobile Competence Centre, vol. RAN WG1, Reno, USA; Nov. 13, 2016. XP051175971. total 8 pages.

* cited by examiner

METHOD FOR COMMUNICATION BETWEEN TERMINALS, NETWORK-SIDE DEVICE, AND TERMINAL

CROSS-REFERENCE TO RELATED APPLICATIONS

This application is a continuation of International Application No. PCT/CN2018/073446, filed on Jan. 19, 2018, which claims priority to Chinese Patent Application No. 201710073998.1, filed on Feb. 10, 2017. The disclosures of the aforementioned applications are hereby incorporated by reference in their entireties.

TECHNICAL FIELD

This application relates to the field of wireless communications technologies, and in particular, to a method for communication between terminals, a network-side device, and a terminal.

BACKGROUND

With development of wireless communications technologies and popularization of intelligent terminals, a quantity of terminals in a wireless cellular network explodes, and a service supported by a wireless communications system develops from an original voice service and short message service to current wireless high-speed data communication. In addition, a quantity of wireless connections worldwide is continuously increasing at a high speed, and various new radio services, such as the internet of things and virtual reality (VR), also emerge. These all have a higher requirement on a next-generation wireless communications system.

Terminals communicate with each other in modes such as D2D (device to device), M2M (machine to machine), and UE cooperation. Direct communication between terminals can share heavy network load on the wireless cellular network, supplement an existing cellular network architecture, and bring a new profit and revenue mode. The D2D communication mode is used as an example. In the D2D communication mode, user data is directly transmitted between the terminals, avoiding relay transmission of the user data through a network during cellular communication, thereby generating a link gain. In addition, a resource between D2D users and a resource between a sidelink and an uplink/a downlink in the D2D communication and the cellular communication may be reused, thereby generating a resource reuse gain. Efficiency of a radio spectrum resource can be increased by using the link gain and the resource reuse gain, thereby increasing a throughput of the entire network. Beamforming is a combination of an antenna technology and a digital signal processing technology, and is used for directional signal transmission and receiving.

A time spent by terminals at both a receive end and a transmit end on beamform training needs to be determined based on quantities of antennas of the receive end and the transmit end. A larger quantity of antennas indicates a longer time of the beamform training. When beamform training is required not only between a base station and a terminal, but also between terminals, a relatively large quantity of channel resources need to be occupied. When there are a relatively large quantity of terminals, spectrum utilization of a system is reduced.

SUMMARY

This application describes a method and an apparatus for communication between terminals, and a system.

According to one aspect, an embodiment of this application provides a method for communication between terminals, including: scheduling, by a network-side device, a terminal to simultaneously perform uplink beamform training and sidelink beamform training, where a first time-frequency resource used for transmitting uplink information and a second time-frequency resource used for transmitting sidelink (SL) information are first configured for the terminal; and after receiving an indication message of the network-side device, transmitting, by the terminal to the network-side device on the first time-frequency resource, the uplink information used for performing uplink beamform training, and simultaneously transmitting, to another terminal on the second time-frequency resource, the sidelink information used for performing sidelink beamform training.

In one embodiment, for a purpose of synchronization between terminals, the second time-frequency resource on which the terminal transmits the sidelink information to the another terminal is a sidelink synchronization channel (SSCH). The sidelink information transmitted by the terminal on the sidelink synchronization channel is sidelink synchronization signal (SLSS). After receiving the synchronization signal, the another terminal selects, based on a status of the another terminal, whether to synchronize with the terminal.

In another embodiment, for a purpose of discovery between terminals, the second time-frequency resource on which the terminal transmits the sidelink information to the another terminal is a physical sidelink discovery channel (PSDCH), and the sidelink information transmitted by the terminal on the physical sidelink discovery channel is a sidelink discovery message. After receiving the discovery message, the another terminal selects, based on a requirement of the another terminal, whether to perform discovery feedback.

In still another possible design, for a purpose of synchronization and discovery between terminals, the second time-frequency resource on which the terminal transmits the sidelink information to the another terminal is a sidelink-specific channel, and the sidelink information transmitted by the terminal on the sidelink-specific channel is sidelink synchronization signal and a sidelink discovery message. After receiving the synchronization signal and the discovery message, the another terminal selects, based on a status of the another terminal, whether to synchronize with the terminal and perform discovery feedback.

The foregoing process of the discovery between the terminals is based on that, after synchronization between the terminal and the another terminal has been completed, the terminal and the another terminal select, based on a requirement, whether to send a discovery message to the peer end.

According to one embodiment, the terminal performs the sidelink beamform training based on an existing uplink beamform training procedure, so that the sidelink beamform training is performed without additionally using a new time-frequency resource, and the synchronization between the terminals or the discovery between the terminals is completed, or the synchronization and the discovery between the terminals are both completed, thereby improving efficiency of communication between the terminals.

According to another aspect, an embodiment of this application provides a network-side device. The network-side device may be a base station, or may be a control node.

In one embodiment, the network-side device includes:

a processor, configured to configure, for a terminal, a first time-frequency resource used for transmitting uplink information and a second time-frequency resource used for transmitting sidelink information, where the first time-frequency resource does not overlap the second time-frequency resource; and a transceiver, configured to send an indication message to the terminal, where the indication message carries the first time-frequency resource and the second time-frequency resource, where the transceiver is further configured to receive the uplink information that is sent by the terminal to the network-side device on the first time-frequency resource and that is used for performing uplink beamform training, where the sidelink information is sidelink information that is transmitted by the terminal on the second time-frequency resource and that is used for performing sidelink beamform training.

In one embodiment, when the terminal transmits the sidelink information to another terminal, the transceiver simultaneously receives the uplink information that is sent by the terminal to the network-side device on the first time-frequency resource and that is used for performing uplink beamform training.

According to another aspect, an embodiment of this application provides a base station. The base station has a function of implementing behavior of the base station in the foregoing method designs. The function may be implemented by hardware, or may be implemented by hardware executing corresponding software. The hardware or software includes one or more modules corresponding to the foregoing function.

In one embodiment, a structure of the base station includes a processor and a transceiver, where the processor is configured to support the base station in performing corresponding functions in the foregoing method. The transceiver is configured to: support communication between the base station and a terminal, send, to the terminal, information or signaling in the foregoing method, and receive information or an instruction that is sent by the base station. The base station may further include a memory, where the memory is configured to couple to the processor and store a program instruction and data that are necessary for the base station.

According to still another aspect, an embodiment of this application provides a terminal. The terminal has a function of implementing behavior of the terminal in the foregoing method designs. The functions may be implemented by hardware, and a structure of the terminal includes a transceiver and a processor. The functions may alternatively be implemented by hardware executing corresponding software. The hardware or software includes one or more modules corresponding to the foregoing function. The modules may be software and/or hardware.

In one embodiment, the terminal includes:

the transceiver, configured to receive an indication message from a network-side device; and the processor, where the processor is configured to obtain, according to the indication message, a first time-frequency resource used for transmitting uplink information and a second time-frequency resource used for transmitting sidelink information that are configured for the terminal by the network-side device; and the first time-frequency resource does not overlap the second time-frequency resource, where the transceiver is further configured to: transmit, to the network-side device on the first time-frequency resource obtained by the processor, the uplink information used for performing uplink beamform training, and simultaneously transmit, to another terminal on the second time-frequency resource obtained by the processor, the sidelink information used for performing sidelink beamform training.

According to still another aspect, an embodiment of this application provides a control node. The control node may include a controller/processor, a memory, and a communications unit. The controller/processor may be configured to coordinate resource management and configuration between a plurality of base stations, and may be configured to perform the method that is for configuring a time-frequency resource for a terminal and that is described in the foregoing embodiment. The memory may be configured to store program code and data of the control node. The communications unit is configured to support communication between the control node and a base station, for example, send information about a configured resource to the base station.

According to still another aspect, an embodiment of this application provides a communications system. The system includes the base station and the terminal in the foregoing aspects, and the terminal includes at least two D2D or M2M terminals or cooperation terminals. Optionally, the communications system may further include the control node in the foregoing embodiments.

According to yet another aspect, an embodiment of this application provides a computer storage medium, configured to store a computer software instruction used by the foregoing base station, where the computer software instruction includes a program designed to execute the foregoing aspects.

According to yet another aspect, an embodiment of this application provides a computer storage medium, configured to store a computer software instruction used by the foregoing terminal, where the computer software instruction includes a program designed to execute the foregoing aspects.

According to the technical solutions provided in the embodiments, the network-side device separately configures, for the terminal, the first time-frequency resource used for the uplink beamform training and the second time-frequency resource used for the sidelink beamform training, and the terminal can perform the sidelink beamform training based on the existing uplink beamform training procedure. Beamform training for the communication between the terminals can be performed without additionally using the new time-frequency resource, thereby greatly saving the time-frequency resources, and improving the efficiency of the communication between the terminals.

BRIEF DESCRIPTION OF DRAWINGS

To describe the embodiments of this application more clearly, the following briefly describes the accompanying drawings required for describing the embodiments. Apparently, the accompanying drawings in the following description show only some embodiments of this application, and a person of ordinary skill in the art may derive other drawings from these accompanying drawings without creative efforts.

DESCRIPTION OF EMBODIMENTS

The following describes the technical solutions in embodiments of this application with reference to the accompanying drawings in the embodiments of this application.

Figure 1:
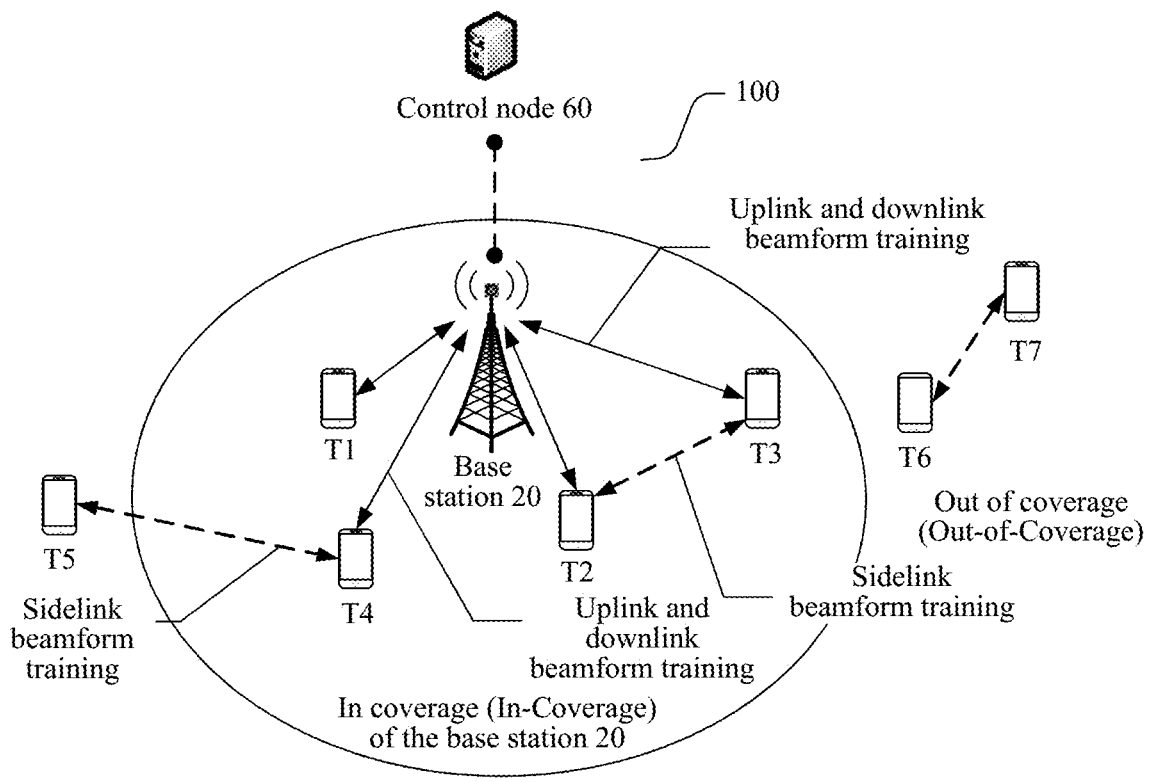
FIG. 1 is a schematic structural diagram of a communications system according to an embodiment of this application.

To resolve a problem in the prior art that time-frequency resource utilization is low when a terminal performs uplink and downlink beamform training and sidelink beamform training, the embodiments of this application provide solutions based on a communications system shown in FIG. 1, to improve beamform training efficiency of the terminal.

A method for communication between terminals provided in this application may be applied to both high frequency communication and low frequency communication. In the embodiments of this application, high frequencies may include a high frequency HF 3 to 30 MHz, a very high frequency VHF 30 to 300 MHz, an ultrahigh frequency UHF 300 MHz to 3 GHz, and a super high frequency SHF 3 GHz to A GHz. With development of a communications technology, a value range of A may be larger.

An embodiment of this application provides a communications system 100. The communications system includes at least one network-side device and a plurality of terminals. The network-side device in this embodiment of this application is an apparatus deployed in a radio access network to provide a wireless communication function for the terminals. The network-side device may be an access network node, a controller having an access function, a base station, or the like. The base station may include various forms of macro base stations, micro base stations (also referred to as small cells), relay stations, access points, and the like. In systems that use different radio access technologies, names of devices that have a base station function may be different. For example, in an LTE system, the device is referred to as an evolved NodeB (eNB or eNodeB), and in a 3rd generation (3G) system, the device is referred to as a NodeB (NB), or the like. For ease of description, in the following embodiments, descriptions are provided by using a base station as an example. The plurality of terminals in the communications system 100 include at least two terminals that can communicate with each other, and further include a terminal that can be used for cellular communication.

The cellular communication is communication performed between a terminal and a base station. For example, in FIG. 1, a terminal T1, a terminal T2, a terminal T3, and a terminal T4 perform cellular communication with a base station 20 over access links. Before performing cellular communication with each other, the terminal and the base station usually need to first perform uplink and downlink beamform training.

Communication between terminals is communication directly performed between two terminals. D2D communication is used as an example. A terminal that performs D2D communication may be referred to as a D2D terminal, links between two terminals that perform D2D communication may be referred to as a pair of D2D links, and the two terminals on the pair of D2D links may be mutually a receive end and a transmit end. During one transmission, one terminal may be the transmit end, and the other terminal may be the receive end. If the two terminals both support a function of simultaneous receiving and sending, each D2D terminal may be both the transmit end and the receive end.

Certainly, the terminal may further have a cellular communication function, and a cellular terminal may also have a function of communicating with another terminal. For example, the terminals T2 to T4 in FIG. 1 can perform both the cellular communication and the D2D communication.

In the communications system 100 in this embodiment, the plurality of terminals may be all located in coverage (In-Coverage) of a same base station, and the plurality of terminals may be served by the same base station. The terminals in the coverage of the same base station are in-coverage terminals. For example, in FIG. 1, the terminal T1 to the terminal T4 are all located in coverage of the BS 20, and served by the BS 20. The terminal T2 and the terminal T3 may be referred to as in-coverage terminals. However, a terminal T5 to a terminal T7 are out of the coverage (Out-of-Coverage) of the base station, and the terminal T6 and the terminal T7 are referred to as out-of-coverage terminals.

In another embodiment, the plurality of terminals in the communications system 100 may alternatively be located in coverage of different base stations, in other words, different terminals and cellular terminals may alternatively be served by different base stations.

In one embodiment of this application, the communications system 100 includes but is not limited to: a narrowband internet of things (NB-IoT for short) system, a global system for mobile communications (GSM for short), an enhanced data rates for GSM evolution (EDGE for short) system, a wideband code division multiple access (WCDMA for short) system, a code division multiple access 2000 (CDMA2000 for short) system, a time division-synchronous code division multiple access (TD-SCDMA for short) system, a long term evolution (LTE for short) system, a next generation 5G mobile communications system including three major application scenarios, namely, eMBB, URLLC, and eMTC, or a new communications system that emerges in the future. The technical solution provided in this embodiment of this application is applicable to the communications system, provided that the communications system includes the cellular communication and the communication between terminals.

System architectures and service scenarios described in the embodiments of this application are intended to describe the technical solutions in the embodiments of this application more clearly, but are not intended to limit the technical solutions provided in the embodiments of this application. A person of ordinary skill in the art may learn that, as a network architecture evolves and a new service scenario emerges, the technical solutions provided in the embodiments of this application are also applicable to a similar technical problem.

In one embodiment of this application, a control node is connected to one or more base stations, may schedule resources in the system in a unified manner, and may configure a resource for the terminal and perform resource reuse decision, interference coordination, or the like. Certainly, during actual application, the control node may alternatively be integrated with the base station. In the communications system shown in FIG. 1, the control node may be connected to the base station, and configure resources for the plurality of terminals and cellular terminals in the coverage of the base station. For example, the base station may be a NodeB in a UMTS system, and the control node may be a network controller. For another example, the base station may be a small cell, and the control node may be a macro base station that covers the small cell. For still another example, the control node may be a cross-standard cooperative controller of a wireless network, or the like, and the base station is a base station in the wireless network. This is not limited in this embodiment of this application.

The terminals provided in this embodiment of this application may include various handheld devices, vehicle-mounted devices, wearable devices, or computing devices that have a wireless communication function, or other processing devices connected to a wireless modem. The terminal may also be referred to as a mobile station (MS for short) and terminal equipment, and may further be referred to as a subscriber unit (subscriber unit), a cellular phone, a smartphone (smartphone), a wireless data card, a personal digital assistant (PDA) computer, a tablet computer, a wireless modem (modem), a handheld (handheld) device, a laptop computer, a cordless phone, or a wireless local loop (WLL) platform, a machine type communication (MTC) terminal, and the like. For ease of description, in all the embodiments of this application, the devices mentioned above are collectively referred to as the terminal.

It should be noted that, a quantity of and types of terminals included in the communications system 100 shown in FIG. 1 are only an example. This embodiment of this application is not limited thereto. In addition, in the communications system 100 shown in FIG. 1, although the base station BS 20 and the plurality of terminals are shown, the communications system 100 may be not limited to including the base station and the terminals, for example, may further include a core network-side device or a device having a virtualized network function. These are apparent for a person of ordinary skill in the art. Details are not described herein one by one.

In addition, it should be noted that, the embodiments of this application are not only applicable to a mobile cellular network communications system, but also applicable to another communications system, such as a WLAN (wireless local area network, wireless local area network) system.

Before the embodiments of this application are described, a time-frequency resource in the embodiments of this application is first briefly described as follows:

In a wireless communications network system, in frequency domain, a subcarrier is usually defined as a basic unit, and several subcarriers form one RB (resource block); in time domain, a symbol is defined as a basic unit, and several symbols form one subframe. In a definition, for a next-generation wireless communications network, one subframe used for transmission includes $N_{symb}$ symbols, total frequency-domain bandwidth includes $N_{RB}$ RBs, and a size of one RB is $N_{sc}^{RB}$, in other words, one RB includes $N_{sc}^{RB}$ subcarriers. In a definition, total bandwidth used for uplink transmission is $N_{RB}^{UL}$ ($0 < N_{RB}^{UL} \leq N^{RB}$), and total bandwidth used for D2D communication is $N_{RB}^{SL}$ ($0 < N_{RB}^{SL} \leq N_{RB}$). It should be noted that, at least 0 consecutive or discrete guard bands may exist in $N_{RB}^{UL}$ and $N_{RB}^{SL}$, and in the guard bands, a transmit end sends no information.

Figure 2:
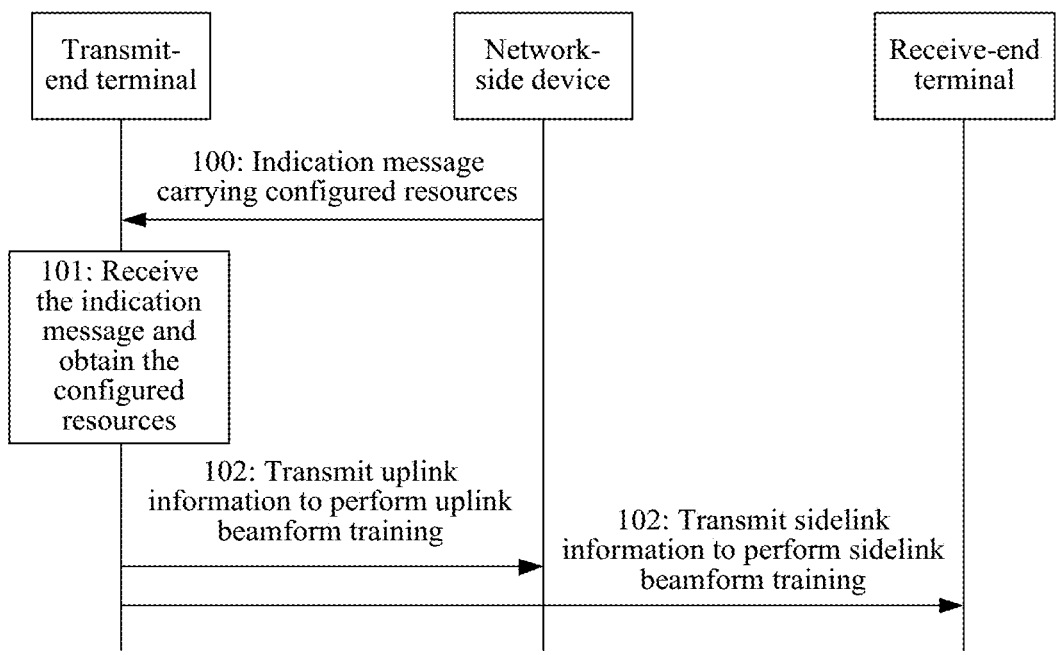
FIG. 2 is a schematic flowchart of Embodiment 1 of a method for communication between terminals according to an embodiment of this application.

FIG. 2 is a schematic flowchart of a method for communication between terminals according to an embodiment of this application.

In one embodiment, a network-side device (for example, the base station 20 or the control node 60 in the communications system 100 in FIG. 1) needs to schedule a terminal (for example, a terminal in the coverage of the base station or the control node) to simultaneously perform uplink beamform training and sidelink beamform training.

Operation 100: The network-side device configures, for the terminal, a first time-frequency resource used for transmitting uplink information and a second time-frequency resource used for transmitting sidelink information, and notifies the terminal, by using an indication message, of the resources configured by the network-side device, where the first time-frequency resource does not overlap the second time-frequency resource, to be specific, a part of a frequency domain resource is used for transmitting the uplink information and the other part of the frequency domain resource is used for transmitting information, namely, the sidelink information, between the terminal and another terminal.

Figure 3:
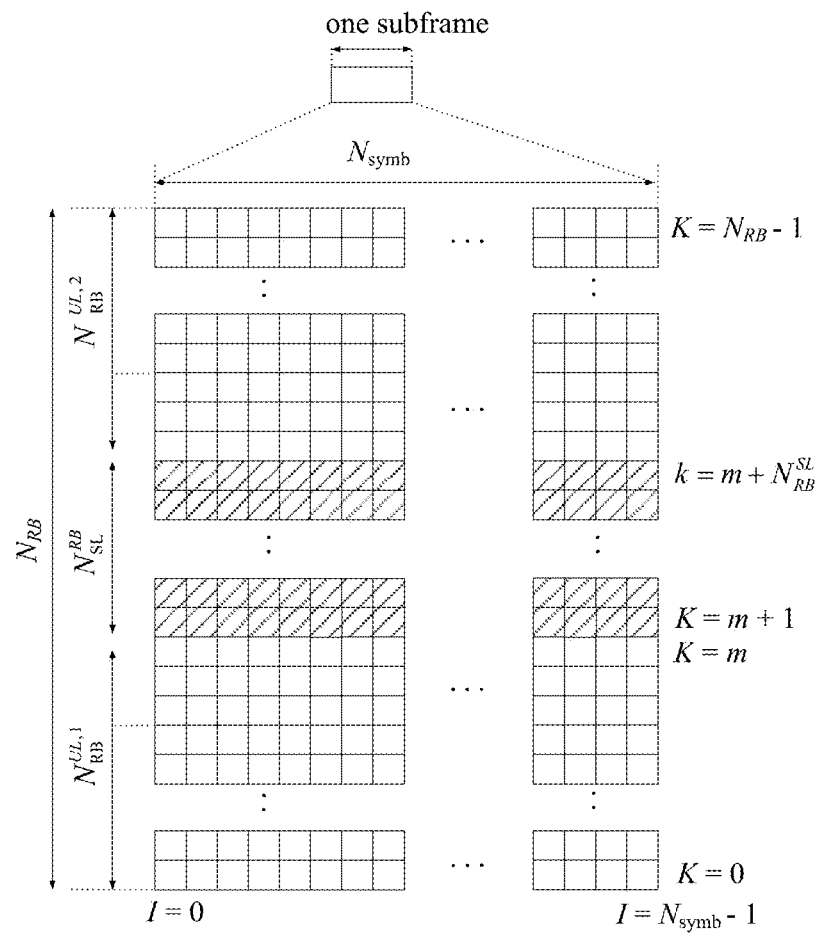
FIG. 3 is a schematic diagram of time-frequency resource allocation according to an embodiment of this application.

Specifically, referring to FIG. 3, descriptions are provided by using an example in which the network-side device configures, for the terminal, a first time-frequency resource whose time length is one subframe and that occupies a part of entire frequency-domain bandwidth. The first time-frequency resource that is configured for the terminal by the network-side device and that is used for transmitting the uplink information to perform uplink beamform training is represented as $N_{RB}^{UL}$. $N_{RB}^{UL} = N_{RB}^{UL,1} + N_{RB}^{UL,2}$, $$N_{RB}^{UL,1} = \sum_{1}^{m+1} N_{SC}^{RB} (0 \leq m \leq N_{RB}^{UL}), \text{ and}$$

$$N_{RB}^{UL,1} = \sum_{1}^{N_{RB} - N_{RB}^{SL} - m - 1} N_{SC}^{RB} (0 \leq m \leq N_{RB}^{UL}),$$

where m is an integer. The second time-frequency resource is represented as $N_{RB}^{SL}$, and total frequency-domain bandwidth available to a system is $N_{RB} = N_{RB}^{UL} + N_{RB}^{SL}$.

Operation 101: The terminal receives the indication message from the network-side device, where the indication message indicates that the network-side device has configured, for the terminal, the first time-frequency resource $N_{RB}^{UL}$ used for transmitting the uplink information and the second time-frequency resource $N_{RB}^{SL}$ used for transmitting the sidelink information.

Operation 102: The terminal transmits, to the network-side device on the first time-frequency resource $N_{RB}^{UL}$, the uplink information used for performing uplink beamform training, and simultaneously transmits, to the another terminal on the second time-frequency resource $N_{RB}^{SL}$, the sidelink information used for performing sidelink beamform training.

Herein, "simultaneously" means that, on a specific symbol of a same subframe, the terminal not only transmits the uplink information to the network-side device, but also transmits the sidelink information to the another terminal. Corresponding to FIG. 3, "simultaneously" means one of $N_{symb}$ symbols in one configured subframe. For example, for the first symbol when I=0, on this symbol, the terminal not only transmits the uplink information to the network-side device, but also transmits the sidelink information to the another terminal.

According to one embodiment, the terminal performs sidelink beamform training based on existing uplink and downlink beamform training procedures, so that the sidelink beamform training is performed without additionally using a new time-frequency resource.

Figure 4:
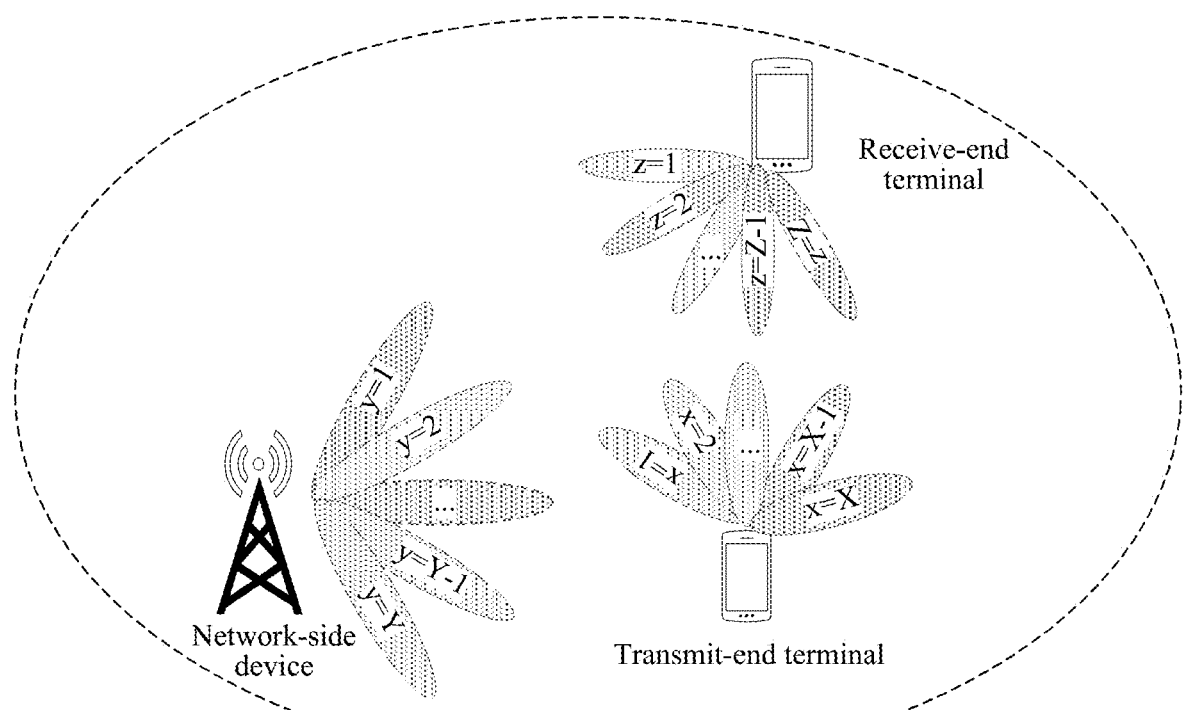
FIG. 4 is a schematic diagram of uplink beamform training and sidelink beamform training according to an embodiment of this application.

During specific implementation, that the terminal transmits the uplink information to the network-side device and transmits the sidelink information to the another terminal is implemented by using respective antenna transceiver units. As shown in FIG. 4, it is assumed that, a total quantity of antenna transceiver units of the terminal is X, where a value of X may be a 2×2 antenna matrix, may be a 4×4 antenna matrix, may be an 8×8 antenna matrix, or the like; a total quantity of antenna transceiver units of the network-side device is Y, where a value of Y may be a 4×4 antenna matrix, may be an 8×8 antenna matrix, may be a 32×32 antenna matrix, or the like; a total quantity of antenna transceiver units of the another terminal is Z, where a value of Z may be a 2×2 antenna matrix, may be a 4×4 antenna matrix, may be an 8×8 antenna matrix, or the like. The network-side device uses downlink physical control signaling (or may use system information or other upper-layer signaling such as RRC signaling) to schedule the terminal to send, on a first time-frequency resource (corresponding to $N_{RB}^{UL} = N_{RB}^{UL,1} + N_{RB}^{UL,2}$ in FIG. 3) of a particular subframe (corresponding to $N_{symb}$ in FIG. 3), the uplink information to perform uplink beamform training, and send, on a second time-frequency resource (corresponding to $N_{RB}^{SL}$ in FIG. 3) of the particular subframe, the sidelink information to perform sidelink beamform training. Details are as follows:

The terminal transmits the uplink information to a $y^{th}$ antenna transceiver unit of the network-side device on the first time-frequency resource $N_{RB}^{UL}$ in an $I^{th}$ time domain unit by using an $x^{th}$ antenna transceiver unit of the terminal, to perform uplink beamform training; and simultaneously transmits the sidelink information to a $z^{th}$ antenna transceiver unit of the another terminal on the second time-frequency resource $N_{RB}^{SL}$, to perform sidelink beamform training, $x \in [1,X]$, $y \in [1,Y]$, $z \in [1,Z]$, $I \in [1,N]$, and N is a total quantity of time domain units that are configured for the terminal by the network-side device and that are used for transmitting the uplink information and the sidelink information.

In one embodiment, the first time-frequency resource $N_{RB}^{UL} = N_{RB}^{UL,1} + N_{RB}^{UL,2}$ on which the terminal transmits the uplink information to the network-side device is a physical random access channel (Physical Random Access Channel, PRACH), and the uplink information transmitted on the PRACH is random access information (Random Access Message, RAM).

In another embodiment, the first time-frequency resource $N_{RB}^{UL} = N_{RB}^{UL,1} + N_{RB}^{UL,2}$ on which the terminal transmits the uplink information to the network-side device is a physical uplink control channel (PUCCH), and the uplink information transmitted on the PUCCH is uplink control information.

The terminal sends, on the X antenna transceiver units of the terminal, the uplink information to the Y antenna transceiver units of the network-side device, and sends the sidelink information to the Z antenna transceiver units of the another terminal, to complete the uplink beamform training with the network-side device and the sidelink beamform training with the another terminal.

It should be noted that, because different communications devices have different transmission capabilities, in other words, different communications devices have different quantities of antenna transceiver units, the network-side device learns of a transmission capability of the terminal when the terminal accesses a network, and indicates, based on transmission capabilities of different terminals, a quantity of times for which the terminal repeatedly sends the uplink information and the sidelink information. For example, if the quantity of antenna transceiver units of the terminal is X=4, the quantity of antenna transceiver units of the network-side device is Y=16, and the quantity of antenna transceiver units of the another terminal is Z=4, the network-side device may configure each antenna transceiver unit of the terminal to repeatedly send the uplink information for 16 times, where the uplink information sent for 16 times is respectively sent to the 16 antenna transceiver units of the network-side device, and configure each antenna transceiver unit to send the sidelink information for four times, where the sidelink information sent for four times is respectively sent to the four antenna transceiver units of the another terminal.

After the Y antenna transceiver units of the network-side device receive the uplink information sent by the X antenna transceiver units of the terminal, a group of optimal antenna transceiver units is selected, from X×Y groups of different antenna transceiver units, as an uplink beamform training result, and the uplink beamform training result is delivered to the terminal.

After the Z antenna transceiver units of the another terminal receive the sidelink information sent by the X antenna transceiver units of the terminal, a group of optimal antenna transceiver units is determined, in X×Z groups of different antenna transceiver units, as a sidelink beamform training result, and the beamform training result is reported to the network-side device or directly sent the beamform training result to the terminal.

In one embodiment of this application, when beamform training is performed, the training may be first performed at an antenna sector level (sector-level). Optionally, after a sector is determined, beam-level (beam-level) training is further performed, to reduce an angle in a particular direction, thereby obtaining a gain. Alternatively, beam-level (beam-level) training may be directly performed. In this embodiment of this application, the beamform training is described mainly by using the antenna sector level as an example, and a used beamform training level is not limited.

Figure 5:
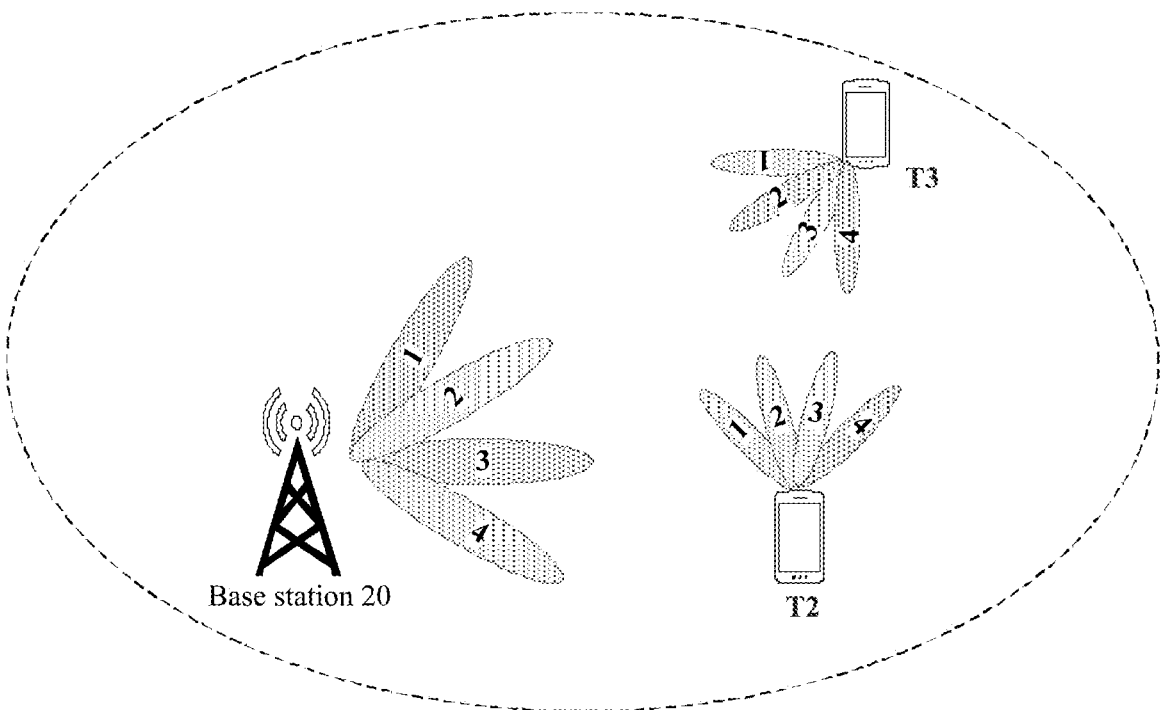
FIG. 5 is another schematic diagram of uplink beamform training and sidelink beamform training according to an embodiment of this application.

In one embodiment, descriptions are provided by using an example in which in FIG. 1, the terminal T2 in the coverage of the base station 20 performs uplink beamform training with the BS 20 and performs sidelink beamform training with the terminal T3, and sidelink synchronization and sidelink discovery are completed in this process. As shown in FIG. 5, it is assumed that the base station 20, the terminal T2, and the terminal T3 all support beam switching of four antenna sectors.

Figure 6:
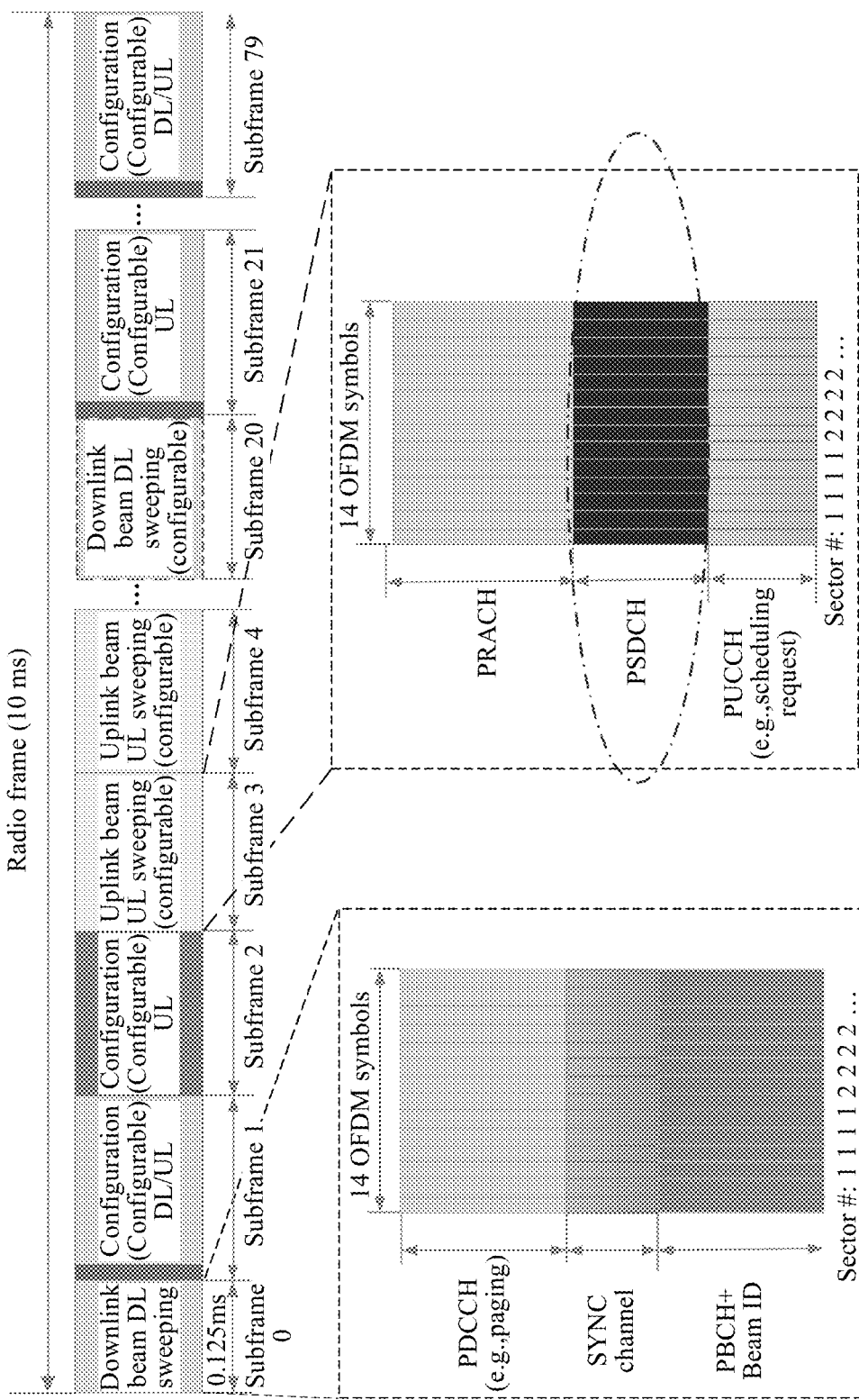
FIG. 6 is another schematic diagram of time-frequency resource allocation according to an embodiment of this application.

As shown in FIG. 6, a radio frame used for communication includes 80 subframes, and each subframe includes 14 symbols, that is, $N_{symb}=14$. The base station 20 sends, in a subframe 0 and a subframe 1, a DL Sweeping subframe to perform downlink beamform training and sends downlink information. The downlink information includes at least one of downlink control information, a synchronization signal, a broadcast signal, a sector identifier, and a beam identifier. The base station 20 schedules the terminal T2 to perform uplink beamform training in a subframe 3. The terminal T2 sends, on the first symbol (corresponding to an I=0$^{th}$ symbol in FIG. 3) of the subframe 3, the uplink information and the sidelink information by using an antenna sector 1 of the terminal T2. In this embodiment, the uplink information includes, in frequency domain (corresponding to $N_{RB}^{UL,2}$ and $N_{RB}^{UL,1}$ in FIG. 3), at least one of the random access information sent on the PRACH and the uplink control information sent on the PUCCH, for example, a scheduling request (Scheduling Request, SR).

Figure 7:
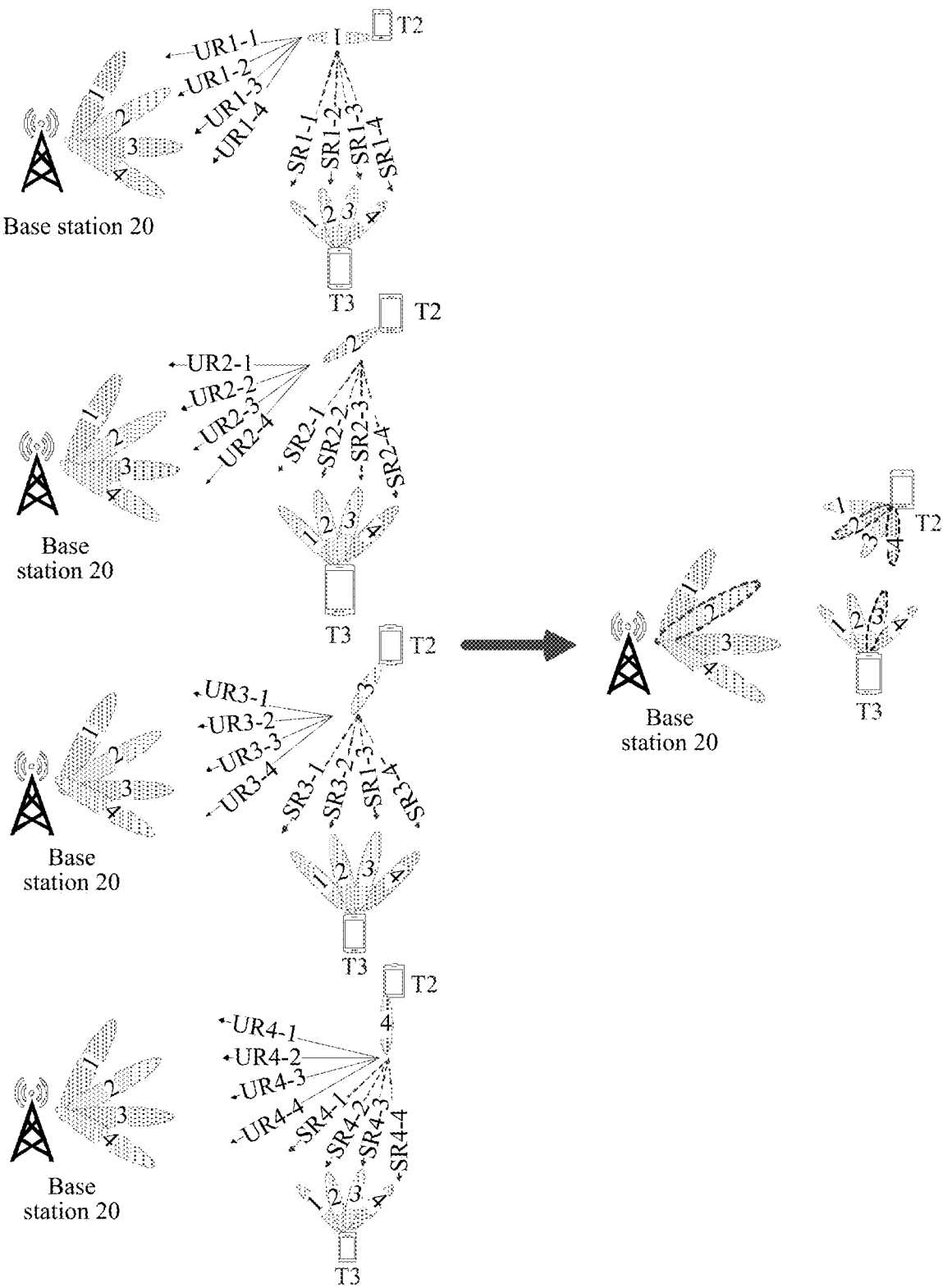
FIG. 7 is still another schematic diagram of uplink beamform training and sidelink beamform training according to an embodiment of this application.

As shown in FIG. 7, antennas of the terminal T2 support four sectors, and the terminal T2 repeatedly sends, by using the antenna sector 1 of the terminal T2 on all the second, the third, and the fourth symbols, the uplink information and the sidelink information that are the same as the previous uplink information and sidelink information. The terminal T2 repeatedly sends, by using an antenna sector 2 of the terminal T2 on subsequent four symbols, the uplink information and the sidelink information that are the same as the previous uplink information and sidelink information. Similarly, the terminal T2 repeatedly sends the same uplink information and sidelink information for four times by separately using antenna sectors 3 and 4 of the terminal T2. When one subframe is insufficient for completing the overall beamform training, the BS 20 configures a plurality of subframes to be used by the terminal T2 to perform the uplink beamform training. Herein, the terminal T2 further repeatedly sends, by using the antenna sector 4 of the terminal T2 on the first and the second symbols of a subframe 4, the uplink information and the sidelink information that are the same as the previous uplink information and sidelink information.

In this way, the terminal T2 repeatedly sends the uplink information and the sidelink information for four times by using each antenna sector of the terminal T2, and the base station 20 repeatedly receives the uplink information for four times by using each antenna sector. The base station 20 obtains uplink beamform training data of 16 groups of different transmit antenna sectors and receive antenna sectors in total, namely, UR1-1, UR1-2, UR4-3, and UR4-4. The base station 20 determines, through comparative analysis, for example, through comparative analysis performed based on a factor such as receive power or a signal to interference plus noise ratio (SINR), that an optimal group is the UR2-2. To be specific, for uplink beam transmission (at the antenna sector level) from the terminal T2, an optimal effect can be achieved when the terminal T2 utilizes the sector 2 for sending and the base station 20 utilizes a sector 2 for receiving. Finally, the base station 20 feeds back a result of the beamform training to the terminal T2.

The base station 20 instructs, by using downlink physical control signaling, system information, or upper layer signaling (such as RRC signaling), the terminal T3 to receive the sidelink information in the subframe in which the terminal T2 sends the sidelink information to perform sidelink beamform training. The terminal T3 also repeatedly receives the sidelink information for four times by using each antenna sector, and obtains sidelink beamform training data of 16 groups of different transmit antenna sectors and receive antenna sectors in total, namely, SR1-1, SRa-2, SR4-3, and SR4-4. The terminal T3 determines, through comparative analysis, for example, through comparative analysis performed based on a factor such as receive power or a signal to interference plus noise ratio (SINR), that an optimal group is the SR4-3. To be specific, for sidelink beam transmission (at the antenna sector level) from the terminal T2, an optimal effect can be achieved when the terminal T2 utilizes the sector 4 for sending and the terminal T3 utilizes a sector 3 for receiving. Finally, the terminal T3 directly feeds back a result of the beamform training to the terminal T2 over a sidelink; or the terminal T3 first feeds back a result of the beamform training to the base station 20, and then the base station 20 determines to feed back the result of the beamform training to the terminal T2. Because a distance between terminals is usually relatively small and relative mobility is relatively small, this link is more stable than an uplink and a downlink. If an optimal effect can be achieved when the terminal T2 utilizes the sector 4 for sending and the terminal T3 utilizes the sector 3 for receiving, it may be inferred according to a channel reciprocity principle that, an optimal effect can also be achieved when the terminal T3 utilizes the sector 3 for sending and the terminal T2 utilizes the sector 4 for receiving.

The terminal T3 may alternatively decode the received sidelink information according to an indication of the downlink physical control signaling, the system information, or the upper layer signaling (such as the RRC signaling) of the base station 20. The terminal T3 not only can learn of information related to a physical sidelink channel for the sidelink beamform training, but also can detect the physical uplink channel on which the terminal T2 sends the uplink information.

The terminal T3 obtains uplink scheduling information (for example, uplink scheduling information such as an RB for sending uplink data, and a used MCS) of the terminal T2 through scheduling of the base station 20.

The terminal T3 obtains, on the uplink channel on which the terminal T2 sends the uplink information, received signal energy information from the terminal T2 based on the scheduling information.

In combination with received signal energy that is from the sidelink information sent by the terminal T2 and that is obtained on the sidelink channel, the terminal T3 further obtains channel information of energy of the entire system bandwidth ($N_{RB}=N_{RB}^{UL}+N_{RB}^{SL}$) for the sidelink beamform training.

To further save time-frequency resources, in one embodiment of this application, the uplink beamform training and the sidelink beamform training may be further combined with a sidelink synchronization process or a sidelink discovery process.

For a purpose of sidelink synchronization, the second time-frequency resource $N_{RB}^{SL}$ that is configured for the terminal T2 by the network-side device and that is for transmitting the sidelink information to the terminal T3 is a sidelink synchronization channel (SLSCH), and the sidelink information transmitted by the terminal T2 on the SSCH is sidelink synchronization signal (SLSS). After receiving the SLSS, the terminal T3 selects, based on a requirement of the terminal T3, whether to perform synchronization feedback.

Figure 8:
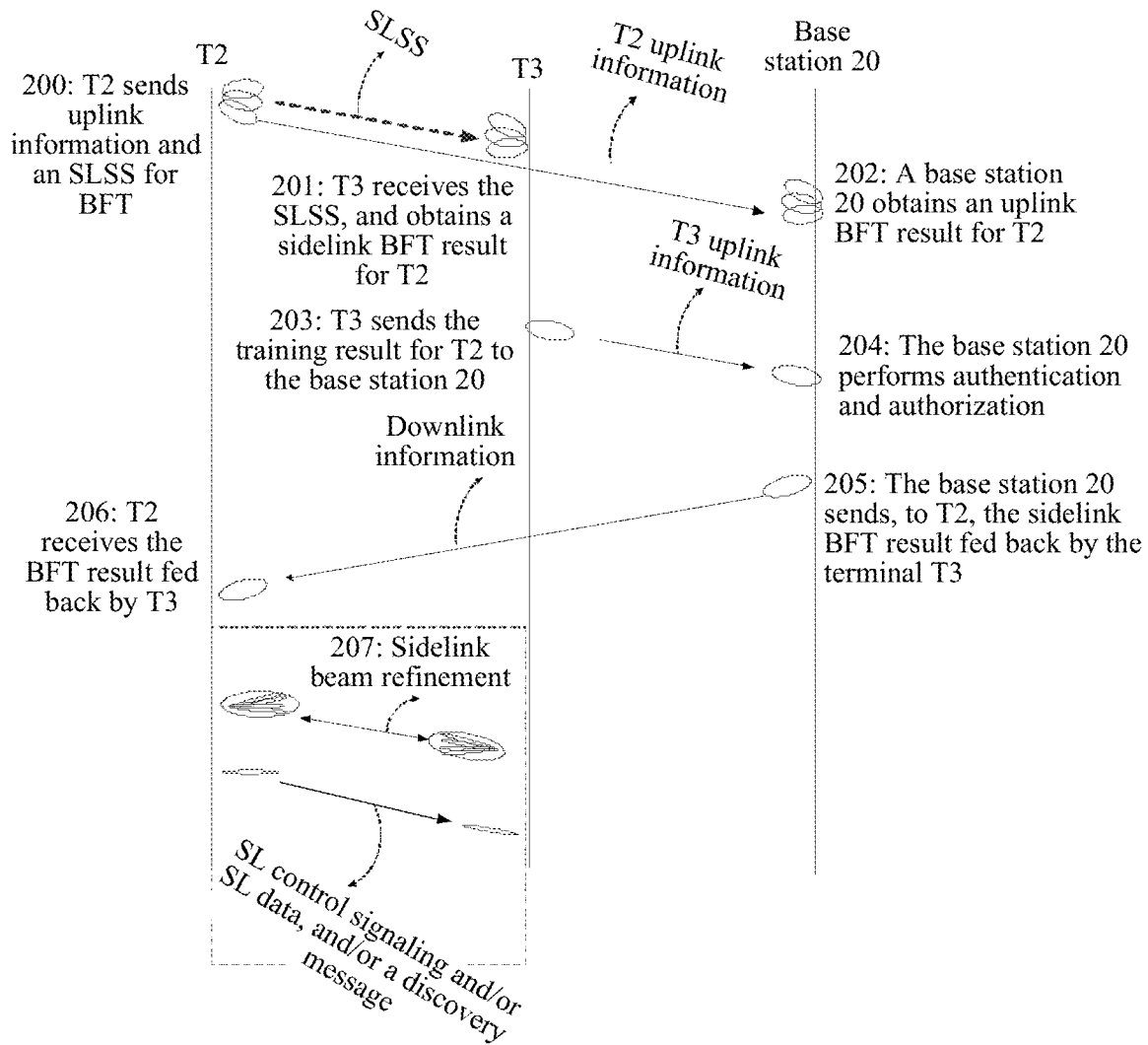
FIG. 8 is a schematic flowchart of combining uplink beamform training and sidelink beamform training with a procedure of synchronization between terminals according to an embodiment of this application.

A specific procedure is shown in FIG. 8:

Operation 200: When sending the SLSS to the terminal T3, the terminal T2 simultaneously sends the UL information to the base station BS 20.

Operation 201: The terminal T3 obtains the SLSS through correct decoding, and obtains a result of sidelink BFT (Beamform Training, beamform training) with the terminal T2, where to be specific, for sending and receiving in sidelink communication between the terminal T2 and the terminal T3, an optimal transmit antenna sector of the terminal T2 and an optimal receive antenna sector of the terminal T3 can be learned of, and an optimal transmit antenna sector of the terminal T3 and an optimal receive antenna sector of the terminal T2 can also be inferred according to a channel reciprocity principle.

Operation 202: The base station 20 receives the uplink information, and obtains a result of uplink BFT with the terminal T2.

Operation 203: Based on that the terminal T3 and the base station 20 have completed uplink beamform training, to be specific, the terminal T3 and the base station 20 have learned of an optimal antenna configuration for uplink sending and receiving at this moment, the terminal T3 sends the sidelink BFT result for the terminal T2 to the base station 20.

Operation 204: The base station 20 receives the sidelink BFT result for the terminal T2 from the terminal T3, and performs authentication and authorization, to determine whether to allow the terminal T2 and the terminal T3 to perform communication.

Operation 205: Based on that the base station 20 and the terminal T2 have completed downlink beamform training, to be specific, the base station 20 and the terminal T2 have learned of an optimal antenna configuration for downlink sending and receiving at this moment, the base station 20 sends, to the terminal T2, the sidelink BFT result for the terminal T2 that is fed back by the terminal T3.

Operation 206: The terminal T2 receives the sidelink BFT result fed back by the terminal T3.

If the terminal T2 and the terminal T3 have obtained an SL grant (a sidelink transmission grant, namely, resource configuration information) from the base station 20, or the terminal T2 and the terminal T3 perform communication when being in-coverage but out-of-band (out-of-band), being out-of-coverage, or the like, the terminal T2 sends, based on the BFT result fed back by the terminal T3, SL control and/or SL data to the terminal T3 by using a directional antenna sector.

In one embodiment, in operation 207, before the terminal T2 sends the SL control and/or the SL data, and/or a discovery message to the terminal T3, the terminal T2 may perform sidelink beam refinement (sidelink beam refinement) with the terminal T3, to be specific, continue to perform training within a specific antenna sector by using a beam that has a smaller angle and that is more directional, to obtain better transmission quality.

According to one embodiment, when performing the uplink beamform training and the sidelink beamform training, the terminal can simultaneously complete the sidelink synchronization, thereby saving a signaling resource, and improving communication efficiency.

For a purpose of sidelink discovery, the second time-frequency resource $N_{RB}^{SL}$ that is configured for the terminal T2 by the network-side device and that is for transmitting the sidelink information to the terminal T3 is a physical sidelink discovery channel (PSDCH) shown in FIG. 6, and the sidelink information transmitted by the terminal T2 on the PSDCH is a sidelink discovery message. After receiving the discovery message, the terminal T3 selects, based on a requirement of the terminal T3, whether to perform discovery feedback.

Figure 9:
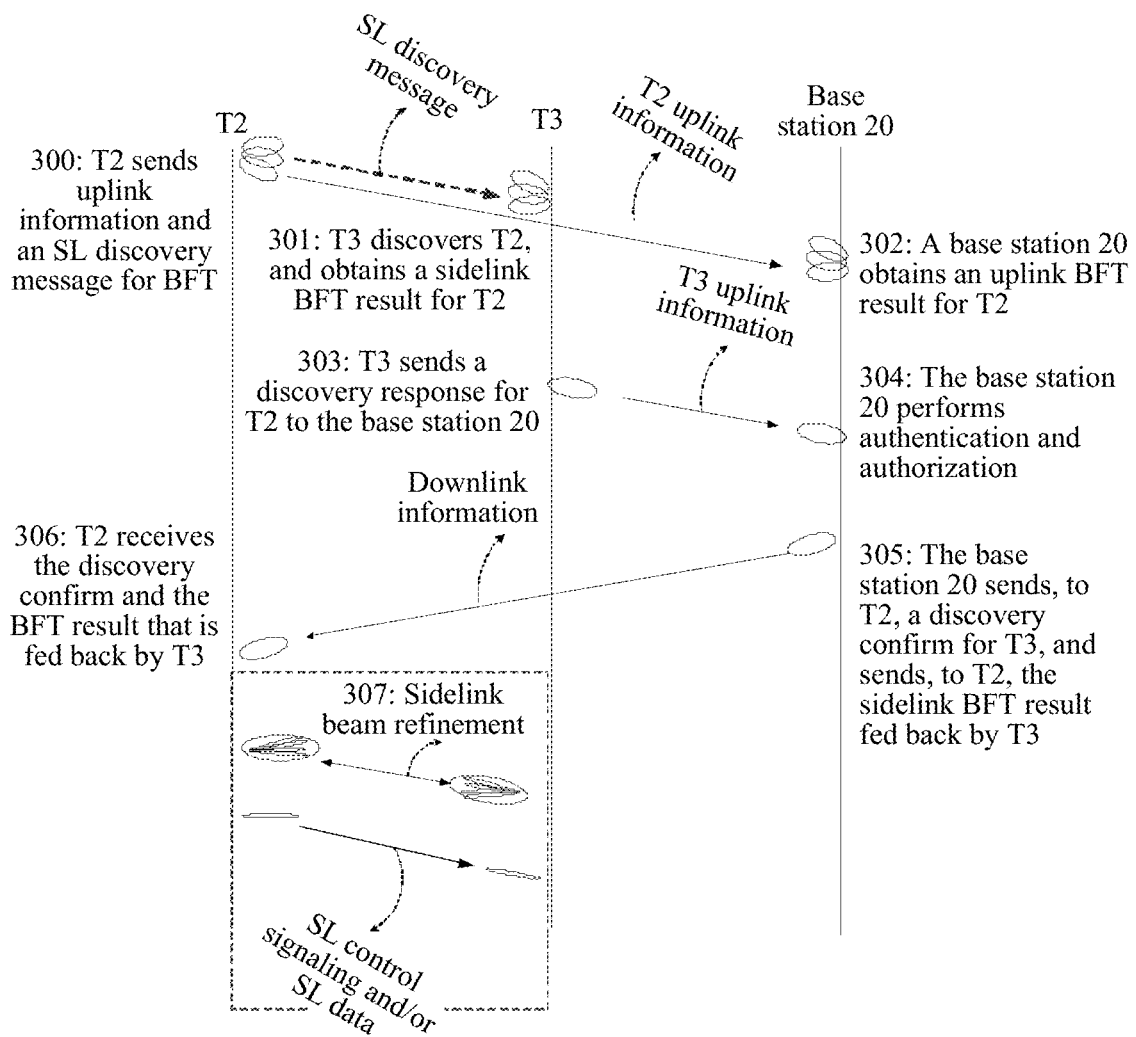
FIG. 9 is a schematic flowchart of combining uplink beamform training and sidelink beamform training with a procedure of discovery between terminals according to an embodiment of this application.

A specific procedure is shown in FIG. 9:

Operation 300: When sending the SL discovery message to the terminal T3, the terminal T2 simultaneously sends the UL information to the base station 20.

Operation 301: The terminal T3 obtains the SL discovery message through correct decoding, discovers the terminal T2, and obtains a result of sidelink BFT with the terminal T2, where to be specific, for sending and receiving in sidelink communication between the terminal T2 and the terminal T3, an optimal transmit antenna sector of the terminal T2 and an optimal receive antenna sector of the terminal T3 can be learned of, and an optimal transmit antenna sector of the terminal T3 and an optimal receive antenna sector of the terminal T2 can also be inferred according to a channel reciprocity principle.

Operation 302: The base station 20 receives the uplink information, and obtains a result of uplink BFT with the terminal T2.

Operation 303: Based on that the terminal T3 and the base station 20 have completed uplink beamform training, to be specific, the terminal T3 and the base station 20 have learned of an optimal antenna configuration for uplink sending and receiving at this moment, the terminal T3 sends a discovery response (Discovery Response) for the terminal T2 to the base station 20, and adds the BFT result to the discovery response.

Operation 304: The base station 20 receives the discovery response for the terminal T2 from the terminal T3, and performs authentication and authorization.

Operation 305: Based on that the base station 20 and the terminal T2 have completed downlink beamform training, to be specific, the base station 20 and the terminal T2 have learned of an optimal antenna configuration for downlink sending and receiving at this moment, the base station 20 sends a discovery confirm (Discovery Confirm) for the terminal T3 to the terminal T2, and notifies the terminal T2 of the sidelink BFT result for the terminal T2 that is fed back by the terminal T3.

Operation 306: The terminal T2 receives the discovery confirm from the base station 20, and learns of the discovery response of the terminal T3 and the BFT result that is fed back by the terminal T3.

If the terminal T2 and the terminal T3 have obtained an SL grant (a sidelink transmission grant, namely, resource configuration information) from the base station 20, or the terminal T2 and the terminal T3 perform communication when being in-coverage but out-of-band, being out-of-coverage, or the like, the terminal T2 sends, based on the BFT result fed back by the terminal T3, SL control and/or SL data to the terminal T3 by using a directional antenna sector. In one embodiment, in operation 307, before the terminal T2 sends the SL control and/or the SL data to the terminal T3, the terminal T2 may perform sidelink beam refinement with the terminal T3, to be specific, continue to perform training within a specific antenna sector by using a beam that has a smaller angle and that is more directional, to obtain better transmission quality.

According to one embodiment, when performing the uplink beamform training and the sidelink beamform training, the terminal can simultaneously complete the sidelink discovery, thereby saving a signaling resource, and improving communication efficiency.

For a purpose of sidelink synchronization and sidelink discovery, that is, the foregoing two processes are combined, the second time-frequency resource $N_{RB}^{SL}$ that is configured for the terminal by the network-side device and that is for transmitting the sidelink information to the another terminal is a sidelink-specific channel, the sidelink information transmitted by the terminal on the specific channel is an SLSS and a sidelink discovery message, and after receiving the SLSS and the sidelink discovery message, the another terminal selects, based on a requirement of the another terminal, whether to perform synchronization and/or discovery feedback. A detailed implementation process thereof is similar to those of the foregoing two embodiments, and details are not described herein again.

It should be noted that, the sidelink discovery process is performed after the two terminals have completed the sidelink synchronization. For example, in an in-coverage scenario, during network access, all terminals complete synchronization according to an indication of the base station, or a terminal sends synchronization signal to another terminal to complete a synchronization process.

According to one embodiments, the terminal performs the sidelink beamform training based on the existing uplink and downlink beamform training procedures, so that the sidelink beamform training is performed without additionally using the new time-frequency resource. Further, the sidelink synchronization and the sidelink discovery can be simultaneously completed when the uplink beamform training and the sidelink beamform training are performed, thereby saving the signaling resource, and improving the communication efficiency.

In the foregoing embodiments provided in this application, the solutions of the method for communication between terminals provided in the embodiments of this application are described separately from the perspectives of network elements and interaction between the network elements. It should be understood that, to implement the foregoing functions, the network elements, such as the terminal, the base station, and the control node, include corresponding hardware structures and/or software modules for performing the functions. A person skilled in the art should be easily aware that units and algorithm steps in the examples described with reference to the embodiments provided in this specification may be implemented in a form of hardware or in a form of a combination of hardware and computer software in this application. Whether a function is implemented by hardware or in a manner of driving hardware by computer software depends on a particular application and a design constraint of the technical solution. A person skilled in the art may use different methods to implement the described functions for each particular application, but it should not be considered that the implementation goes beyond the scope of this application.

Figure 10:
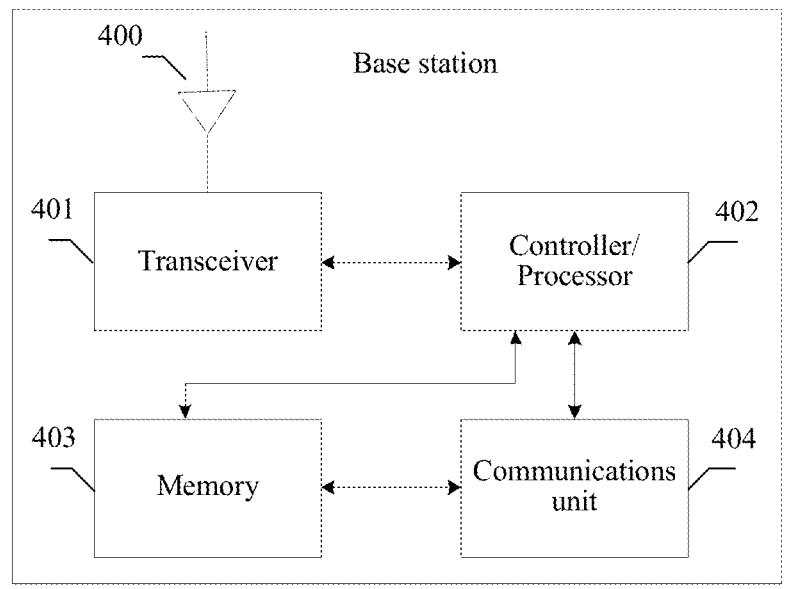
FIG. 10 is a schematic structural diagram of a base station according to an embodiment of this application.

FIG. 10 is a possible schematic structural diagram of the network-side device in the foregoing embodiments. The network-side device may be the base station 20 shown in FIG. 1, or may be another device having a similar function.

The network-side device includes:

a controller/processor 402, configured to configure, for a terminal, a first time-frequency resource used for transmitting uplink information and a second time-frequency resource used for transmitting sidelink information, where the first time-frequency resource does not overlap the second time-frequency resource; and a transceiver 401, configured to send an indication message to the terminal, where the indication message carries the first time-frequency resource and the second time-frequency resource, where the transceiver 401 is further configured to receive the uplink information that is sent by the terminal to the network-side device on the first time-frequency resource and that is used for performing uplink beamform training, where the sidelink information is information that is transmitted by the terminal on the first time-frequency resource and that is used for performing sidelink beamform training. In an implementation, when the terminal transmits the sidelink information to another terminal, the transceiver 401 simultaneously receives the uplink information that is sent by the terminal to the network-side device on the first time-frequency resource and that is used for performing uplink beamform training.

In one embodiment, the base station may further include an antenna transceiver unit 400. The antenna transceiver unit 400 may be configured to support information receiving and sending between the network-side device and the terminal in the foregoing embodiments, or configured to support information receiving and sending between the network-side device and another network-side device. The antenna transceiver unit 400 may be built in the transceiver 401 of the base station; or may be disposed outside the transceiver 401 of the base station, for example, may be a remote radio frequency module.

The controller/processor 402 may be configured to configure a resource for a terminal. On an uplink, an uplink signal from the terminal is transmitted by the antenna transceiver unit 400, received and demodulated by the transceiver 401, and further processed by the controller/processor 402, to recover service data and a signaling message sent by the terminal. On a downlink, service data and a signaling message are processed by the controller/processor 402, and demodulated by the transceiver 401, to generate a downlink signal and send the downlink signal to the terminal. The controller/processor 402 is further configured to perform resource configuration in the communication method described in the foregoing embodiments, configure an uplink transmission resource and a sidelink transmission resource for a terminal used as a transmit end on at least one pair of links, configure a sidelink transmission resource for a terminal used as a receive end on the at least one pair of links, and optionally, further configure a sounding signal sending resource for a cellular terminal. The controller/processor 402 may further be configured to perform a processing process of the base station in FIG. 2, FIG. 8, or FIG. 9 and/or used for another process of the technology described in this application. The base station may further include a memory 403 that may be configured to store program code and data of the base station. The base station may further include a communications unit 404, configured to support the base station in communicating with another network entity, for example, configured to support the base station in communicating with another communications network entity, such as the control node 60, shown in FIG. 1.

It may be understood that, FIG. 10 shows only a simplified design of the base station. During actual application, the base station may include any quantity of transmitters, receivers, processors, controllers, memories, communications units, and the like, and all base stations that can implement this application shall fall within the protection scope of this application.

Figure 11:
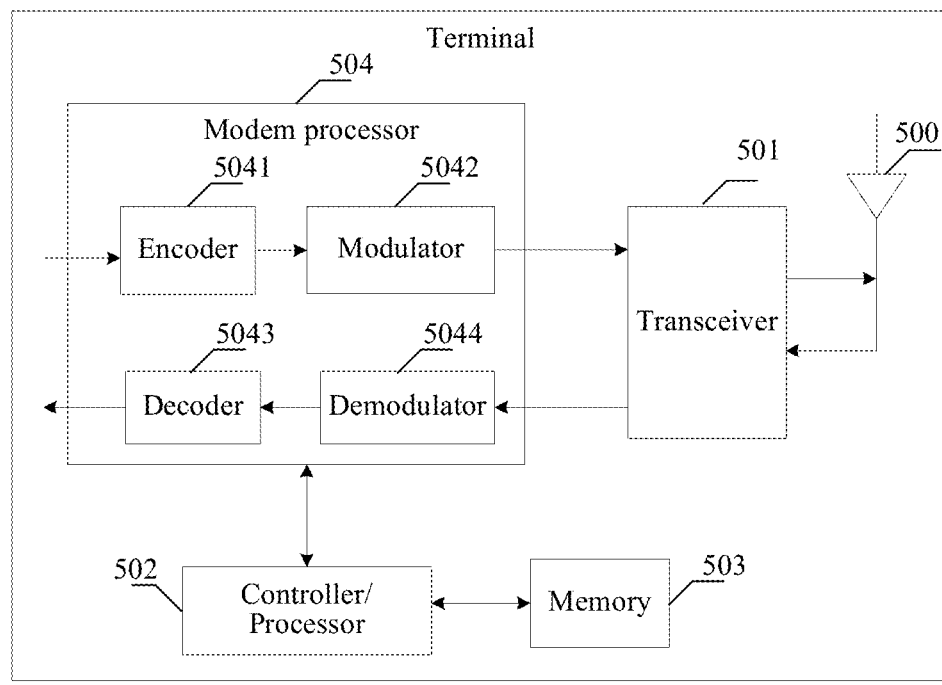
FIG. 11 is a schematic structural diagram of a terminal according to an embodiment of this application.

FIG. 11 is a simplified schematic diagram of a possible design structure of the terminal in the foregoing embodiments. The terminal may be one of the terminals T4, T5, T6, and T7 shown in FIG. 1. The terminal includes a transceiver 501 and a controller/processor 502, and may further include a memory 503 and a modem processor 504.

The transceiver 501 is configured to receive an indication message from a network-side device, where the indication message indicates a first time-frequency resource used for transmitting uplink information and a second time-frequency resource used for transmitting sidelink information that are configured for the terminal by the network-side device; and the first time-frequency resource does not overlap the second time-frequency resource.

The controller/processor 502 is configured to: instruct the transceiver 501 to transmit, to the network-side device on the first time-frequency resource, the uplink information used for performing uplink beamform training, and simultaneously instruct the transceiver 501 to transmit, to another terminal on the second time-frequency resource, the sidelink information used for performing sidelink beamform training.

In one embodiment, the terminal may further include an antenna transceiver unit 500. The antenna transceiver unit 500 may be integrated in the transceiver 501, or may be disposed outside the transceiver 501. The uplink information is transmitted by the antenna transceiver unit 500 to the base station in the foregoing embodiments. On a downlink, the antenna transceiver unit 500 receives downlink information transmitted by the base station in the foregoing embodiments. The transceiver 501 adjusts (for example, through filtering, amplification, down-conversion, or digitization) a signal received from the antenna transceiver unit 500, and provides input sampling. In the modem processor 504, an encoder 5041 receives service data and a signaling message that are to be sent on an uplink, and processes (for example, through formatting, encoding, and interleaving) the service data and the signaling message. A modulator 5042 further processes (for example, through symbol mapping and modulation) the encoded service data and the encoded signaling message, and provides output sampling. A demodulator 5044 processes (for example, through demodulation) the input sampling and provides a symbol estimation. The decoder 5043 processes (for example, through de-interleaving and decoding) the symbol estimation and provides decoded data and a decoded signaling message that are to be sent to the terminal. The encoder 5041, the modulator 5042, the demodulator 5044, and the decoder 5043 may be implemented by the combined modem processor 504. These units perform processing based on radio access technologies (such as access technologies in an LTE system and another evolved system) used in a radio access network.

The controller/processor 502 controls and manages an action of the terminal, to perform the processing performed by the terminal in the foregoing embodiments. In an example, the controller/processor 502 is configured to support the terminal in performing content related to the terminal processing in FIG. 2, FIG. 8, or FIG. 9. The memory 503 is configured to store program code and data that are used for the terminal.

Figure 12:
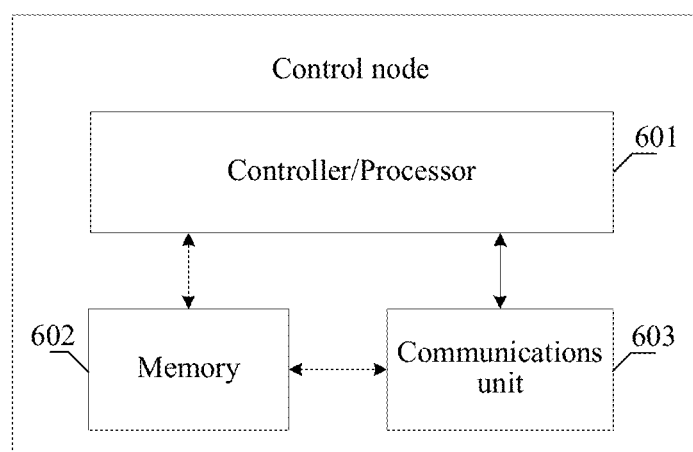
FIG. 12 is a schematic structural diagram of a control node according to an embodiment of this application.

FIG. 12 is a schematic diagram of the control node in the foregoing embodiments. The control node may be the control node 60 shown in FIG. 1. The control node may include a controller/processor 601, a memory 602, and a communications unit 603. The controller/processor 601 may be configured to coordinate resource management and configuration between a plurality of base stations, may be configured to perform the foregoing embodiments to perform resource configuration, and may perform frequency resource reuse, decision, and the like between communications links. The memory 602 may be configured to store program code and data of the control node. The communications unit 603 is configured to support communication between the control node and the base station, for example, send information about a configured resource to the base station.

For the network-side device described in the foregoing embodiments of this application, the network-side device may be the base station in FIG. 10, or the control node shown in FIG. 12.

The controller/processor configured to perform functions of the foregoing base station, terminal, base station, or control node in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various examples of logical blocks, modules, and circuits described with reference to content disclosed in this application. Alternatively, the processor may be a combination for implementing a computing function, for example, a combination of one or more microprocessors or a combination of the DSP and a microprocessor.

The methods or algorithm steps described with reference to the content disclosed in this application may be implemented in a hardware manner, or may be implemented in a manner of executing a software instruction by a processor. The software instruction may include a corresponding software module. The software module may be stored in a RAM, a flash memory, a ROM, an EPROM, an EEPROM, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in the terminal. Certainly, the processor and the storage medium may exist in the terminal as discrete components.

A person skilled in the art should be aware that in one or more of the foregoing examples, the functions described in this application may be implemented by using hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application.

The invention claimed is:

1. A method for communication between terminals, comprising:

receiving, by a terminal, an indication message from a network-side device, wherein the indication message indicates a first time-frequency resource used for transmitting uplink information and a second time-frequency resource used for transmitting sidelink information that are configured for the terminal by the network-side device; and the first time-frequency resource does not overlap the second time-frequency resource; and transmitting, by the terminal to the network-side device on the first time-frequency resource, the uplink information used for performing uplink beamform training, and simultaneously transmitting, to another terminal on the second time-frequency resource, the sidelink information used for performing sidelink beamform training.

2. The method for communication between terminals according to claim 1, the transmitting, by the terminal to the network-side device on the first time-frequency resource, the uplink information used for performing uplink beamform training, and simultaneously transmitting, to another terminal on the second time-frequency resource, the sidelink information used for performing sidelink beamform training comprises:

transmitting, by the terminal, the uplink information to a $y^{th}$ antenna transceiver unit of the network-side device on the first time-frequency resource in an $I^{th}$ time domain unit by using an $x^{th}$ antenna transceiver unit of the terminal, to perform uplink beamform training; and simultaneously transmitting the sidelink information to a $z^{th}$ antenna transceiver unit of the another terminal on the second time-frequency resource, to perform sidelink beamform training, wherein $x \in [1,X]$, wherein X is a total quantity of antenna transceiver units of the terminal; $y \in [1,Y]$, wherein Y is a total quantity of antenna transceiver units of the network-side device; $z \in [1,Z]$, wherein Z is a total quantity of antenna transceiver units of the another terminal; and $I \in [1,N]$, wherein N is a total quantity of time domain units that are configured for the terminal by the network-side device and that are used for transmitting the uplink information and the sidelink information; and sending, by the terminal on the X antenna transceiver units of the terminal, the uplink information to the Y antenna transceiver units of the network-side device, to obtain uplink beamform training data of X×Y groups of different antenna transceiver units, and sending the sidelink information to the Z antenna transceiver units of the another terminal, to obtain sidelink beamform training data of X×Z groups of different antenna transceiver units.

3. The method for communication between terminals according to claim 1, wherein the second time-frequency resource is a sidelink synchronization channel, and the sidelink information is sidelink synchronization signal; or the second time-frequency resource is a physical sidelink discovery channel, and the sidelink information is a sidelink discovery message; or the second time-frequency resource is a sidelink-specific channel, and the sidelink information is sidelink synchronization signal and a sidelink discovery message.

4. The method for communication between terminals according to claim 1, wherein the first time-frequency resource is a physical random access channel, and the uplink information is random access information; or the first time-frequency resource is a physical uplink control channel, and the uplink information is uplink control information.

5. The method for communication between terminals according to claim 2, wherein the antenna transceiver unit is an antenna sector and/or a beam.

6. The method for communication between terminals according to claim 2, wherein the method further comprises:

receiving, by the terminal, an uplink beamform training result and a sidelink beamform training result that are delivered by the network-side device; or receiving, by the terminal, an uplink beamform training result delivered by the network-side device and a sidelink beamform training result sent by the another terminal to the terminal, wherein the uplink beamform training result is a group of optimal antenna transceiver units in the X×Y groups of different antenna transceiver units between the terminal and the network-side device; and the sidelink beamform training result is a group of optimal antenna transceiver units in the X×Z groups of different antenna transceiver units between the terminal and the another terminal.

7. A non-transitory computer readable storage medium, wherein the computer readable storage medium stores a computer program, wherein when the computer program is executed by a computer, the computer implements the method according to claim 1.

8. A method for communication between terminals, comprising:

sending, by a network-side device, an indication message to a terminal, wherein the indication message carries a first time-frequency resource used for transmitting uplink information and a second time-frequency resource used for transmitting sidelink information that are configured for the terminal by the network-side device; and the first time-frequency resource does not overlap the second time-frequency resource; and simultaneously receiving, by the network-side device when the terminal transmits the sidelink information to another terminal, the uplink information that is sent by the terminal to the network-side device on the first time-frequency resource and that is used for performing uplink beamform training, wherein the sidelink information is sidelink information that is transmitted by the terminal on the second time-frequency resource and that is used for performing sidelink beamform training.

9. A terminal, comprising:

a transceiver, configured to receive an indication message from a network-side device; and a processor, wherein the processor is configured to obtain, according to the indication message, a first time-frequency resource used for transmitting uplink information and a second time-frequency resource used for transmitting sidelink information that are configured for the terminal by the network-side device; and the first time-frequency resource does not overlap the second time-frequency resource, wherein the transceiver is further configured to: transmit, to the network-side device on the first time-frequency resource obtained by the processor, the uplink information used for performing uplink beamform training, and simultaneously transmit, to another terminal on the second time-frequency resource obtained by the processor, the sidelink information used for performing sidelink beamform training.

10. The terminal according to claim 7, wherein the transceiver comprises X antenna transceiver units; and an $x^{th}$ antenna transceiver unit is configured to: transmit the uplink information to a $y^{th}$ antenna transceiver unit of the network-side device on the first time-frequency resource in an $I^{th}$ time domain unit, to perform uplink beamform training; and simultaneously transmit the sidelink information to a $z^{th}$ antenna transceiver unit of the another terminal on the second time-frequency resource, to perform sidelink beamform training, wherein $x \in [1,X]$ wherein X is a total quantity of antenna transceiver units of the terminal; $y \in [1,Y]$, wherein Y is a total quantity of antenna transceiver units of the network-side device; $z \in [1,Z]$, wherein Z is a total quantity of antenna transceiver units of the another terminal; and $l \in [1,N]$, wherein N is a total quantity of time domain units that are configured for the terminal by the network-side device and that are used for transmitting the uplink information and the sidelink information; and the X antenna transceiver units send the uplink information to the Y antenna transceiver units of the network-side device, to obtain uplink beamform training data of X×Y groups of different antenna transceiver units; and send the sidelink information to the Z antenna transceiver units of the another terminal, to obtain sidelink beamform training data of X×Z groups of different antenna transceiver units.

11. The terminal according to claim 7, wherein the second time-frequency resource is a sidelink synchronization channel, and the sidelink information is sidelink synchronization signal; or the second time-frequency resource is a physical sidelink discovery channel, and the sidelink information is a sidelink discovery message; or the second time-frequency resource is a sidelink-specific channel, and the sidelink information is sidelink synchronization signal and a sidelink discovery message.

12. The terminal according to claim 7, wherein the first time-frequency resource is a physical random access channel, and the uplink information transmitted by the antenna transceiver units on the physical random access channel is random access information; or the first time-frequency resource is a physical uplink control channel, and the uplink information transmitted by the antenna transceiver units on the physical uplink control channel is uplink control information.

13. The terminal according to claim 10, wherein the antenna transceiver unit is an antenna sector and/or a beam.

14. The terminal according to claim 10, wherein the transceiver is further configured to receive an uplink beamform training result and a sidelink beamform training result that are delivered by the network-side device; or receive an uplink beamform training result delivered by the network-side device and a sidelink beamform training result sent by the another terminal to the terminal, wherein the uplink beamform training result is a group of optimal antenna transceiver units in the X×Y groups of different antenna transceiver units between the terminal and the network-side device; and the sidelink beamform training result is a group of optimal antenna transceiver units in the X×Z groups of different antenna transceiver units between the terminal and the another terminal.

15. A network-side device, comprising:

a processor, configured to configure, for a terminal, a first time-frequency resource used for transmitting uplink information and a second time-frequency resource used for transmitting sidelink information, wherein the first time-frequency resource does not overlap the second time-frequency resource; and a transceiver, configured to send an indication message to the terminal, wherein the indication message carries the first time-frequency resource and the second time-frequency resource, wherein the transceiver is further configured to receive the uplink information that is sent by the terminal to the network-side device on the first time-frequency resource and that is used for performing uplink beamform training, wherein the sidelink information is sidelink information that is transmitted by the terminal on the second time-frequency resource and that is used for performing sidelink beamform training.

* * * * *